(12) United States Patent
Woodruff et al.

(10) Patent No.: US 11,582,699 B2
(45) Date of Patent: Feb. 14, 2023

(54) MOBILE AD HOC NETWORK PROVIDING POWER CONTROL AND ASSOCIATED METHODS

(71) Applicant: HARRIS GLOBAL COMMUNICATIONS, INC., Albany, NY (US)

(72) Inventors: Michael Woodruff, Macedon, NY (US); Rebecca Ann Honecker, Webster, NY (US); Nick A. Van Stralen, Bloomfield, NY (US)

(73) Assignee: HARRIS GLOBAL COMMUNICATIONS, INC., Albany, NY (US)

( * ) Notice: Subject to any disclaimer, the term of this patent is extended or adjusted under 35 U.S.C. 154(b) by 99 days.

(21) Appl. No.: 17/175,726

(22) Filed: Feb. 15, 2021

(65) Prior Publication Data
US 2022/0264474 A1 Aug. 18, 2022

(51) Int. Cl.
*H04W 52/24* (2009.01)
*H04W 52/54* (2009.01)
(Continued)

(52) U.S. Cl.
CPC ....... *H04W 52/241* (2013.01); *H04W 52/367* (2013.01); *H04W 52/54* (2013.01); *H04W 84/18* (2013.01)

(58) Field of Classification Search
CPC . H04W 52/241; H04W 52/367; H04W 52/54; H04W 84/18
See application file for complete search history.

(56) References Cited

U.S. PATENT DOCUMENTS

| 7,693,119 B2 | 4/2010 | Lee et al. |
| 7,983,230 B1 | 7/2011 | Li et al. |

(Continued)

FOREIGN PATENT DOCUMENTS

| CN | 101208909 | 6/2008 |
| WO | 2013185319 | 12/2013 |

OTHER PUBLICATIONS

Yan et al., "An Optimistic Power Control MAC Protocol for Mobile Ad Hoc Networks," 2006 IEEE International Conference on Communications, Istanbul, Turkey, 2006, pp. 3615-3620.

(Continued)

*Primary Examiner* — Jae Y Lee
(74) *Attorney, Agent, or Firm* — Allen, Dyer, Doppelt, + Gilchrist, P.A. Attorneys at Law

(57) ABSTRACT

A mobile ad hoc network (MANET) includes a first MANET node having a first radio frequency (RF) transceiver and a first controller coupled thereto to generate RF transmissions. A second MANET node has a second RF transceiver configured to communicate with the first RF transceiver, and a second controller coupled to the second RF transceiver. The second controller is configured to cooperate with the second RF transceiver to receive the RF transmissions from the first MANET node, generate a normalized reception value based upon the received RF transmissions and send the normalized reception value to the first MANET node. The first controller is configured to control a transmit power level for a subsequent RF transmission based upon the normalized reception value from the second MANET node.

18 Claims, 7 Drawing Sheets

(51) Int. Cl.
*H04W 52/36* (2009.01)
*H04W 84/18* (2009.01)

(56) References Cited

U.S. PATENT DOCUMENTS

| | | | |
|---|---|---|---|
| 8,175,532 B2 * | 5/2012 | Nanda | H04B 7/0602 |
| | | | 455/25 |
| 8,285,216 B2 | 10/2012 | Malladi et al. | |
| 8,509,706 B2 | 8/2013 | Tang | |
| 8,781,416 B1 * | 7/2014 | Clark | H04L 1/242 |
| | | | 455/115.2 |
| 8,977,313 B2 | 3/2015 | Chao et al. | |
| 2003/0189906 A1 | 10/2003 | Belcea | |
| 2006/0035660 A1 | 2/2006 | Anderson | |
| 2008/0132264 A1 | 6/2008 | Krishnamurthy et al. | |
| 2011/0059762 A1 | 3/2011 | Jones et al. | |
| 2013/0039286 A1 | 2/2013 | Larsson et al. | |
| 2017/0222706 A1 * | 8/2017 | Chen | H04B 7/0617 |
| 2020/0351042 A1 * | 11/2020 | Lee | H04L 5/22 |
| 2021/0099329 A1 * | 4/2021 | Hellfajer | H04L 27/0014 |

OTHER PUBLICATIONS

PR Newswire, "DTC Delivers Unmatched Performance to the U.S. Army," DTC Communications (DTC), Aug. 31, 2020, pp. 1-2.

* cited by examiner

| POWER | MCS | FREQUENCY | SNR |
|---|---|---|---|
| +15dBm | 3 | 300 | 3 |
| +20dBm | 4 | 350 | 1 |
| +10dBm | 2 | 400 | 7 |

72

| POWER | MCS | FREQUENCY | SNR |
|---|---|---|---|
| +30dBm | 4 | 350 | 13.3 |
| +30dBm | 4 | 350 | 11 |
| +30dBm | 4 | 350 | 8.5 |

74

MOBILE AD HOC NETWORK PROVIDING POWER CONTROL AND ASSOCIATED METHODS

FIELD OF THE INVENTION

The present invention relates to the field of communications networks, and, more particularly, to mobile ad hoc networks and related methods.

BACKGROUND OF THE INVENTION

Wireless networks have experienced increased development in the past decade. One of the most rapidly developing areas is mobile ad hoc networks. Physically, a mobile ad hoc network (MANET) includes a number of geographically-distributed, potentially mobile nodes that are wirelessly connected by one or more radio frequency channels. Compared with other types of networks, such as cellular networks or satellite networks, the more distinctive feature of mobile ad hoc networks is the lack of any fixed infrastructure. The mobile ad hoc network may be formed of mobile nodes only, and a mobile ad hoc network may be created on-the-fly as the nodes transmit to or receive from other nodes. Mobility can vary from zero distance units per time unit to whatever the upper bound may be placed on the nodes. The network does not generally depend on a particular node and dynamically adjusts as some nodes join and other nodes leave the network.

In an environment where a fixed communication infrastructure is unreliable or unavailable, for example, in a natural disaster area struck by an earthquake or hurricane, a mobile ad hoc network may be quickly deployed and provide much needed communications. While accommodating the requirements of a hostile environment or emergency situation may be a driving force behind the development of these networks, mobile ad hoc networks are finding new applications in civilian and commercial areas. Mobile ad hoc networks allow people to exchange data in the field or even in a confined setting, such as a classroom, without using any network structure except the network they create by turning on their computers or mobile wireless communication devices.

Many mobile ad hoc networks transmit among nodes at a maximum or high power level to ensure that RF signals are accurately received by all neighboring nodes spaced from the transmitting node. In some hostile environments, however, non-network users may operate detection equipment and detect the RF emissions within the mobile ad hoc network, and therefore, jam those signals or triangulate the signals to determine network node locations.

Communicating link quality parameters and data about the received signal strength and interference across many nodes in the mobile ad hoc networks to determine when power levels should be raised or lowered is complicated and expensive, especially in a multi-data rate, frequency hopping mobile ad hoc network. Additionally, link conditions may change rapidly, requiring frequent feedback among mobile nodes, thus increasing the signal overhead in the mobile ad hoc network. It may be advantageous if transmissions from each radio or mobile node could be as quiet as possible, i.e., low power, to maintain network conductivity, without affecting the data rate and reception by other nodes of transmitted signals in the mobile ad hoc network.

Current power control approaches employed in mobile ad hoc networks decrease transmit power to save battery life and increase network longevity, or reduce interference regions to enable spatial reuse. Some power saving algorithms define a power aware routing protocol that significantly increases background network traffic and applies power control to data transmissions. Many network overhead transmissions are still required at maximum power. Also, known power control algorithms have not usually been adapted to frequency hopping mobile ad hoc networks. The need for line-of-sight mobile ad hoc networking with a low probability of detection may require an adaptive power control approach that does not burden unnecessarily the network and create a high overhead.

SUMMARY OF THE INVENTION

In general, a mobile ad hoc network (MANET) may include a first MANET node having a first radio frequency (RF) transceiver and a first controller coupled thereto to generate a plurality of RF transmissions. A second MANET node may include a second RF transceiver configured to communicate with the first RF transceiver, and a second controller coupled to the second RF transceiver. The second controller may be configured to cooperate with the second RF transceiver to receive the plurality of RF transmissions from the first MANET node, generate a normalized reception value based upon the received plurality of RF transmissions and send the normalized reception value to the first MANET node. The first controller may be configured to control a transmit power level for a subsequent transmission based upon the normalized reception value from the second MANET node.

The second controller may be configured to generate the normalized reception value based upon a respective received signal-to-noise ratio (SNR) value for each transmission. The normalized reception value may be based upon the respective received signal-to-noise ratio (SNR) value for each transmission normalized based upon an actual transmit power level relative to a common transmit power level. The first controller may be configured to cooperate with the first RF transceiver to communicate the actual transmit power level in its transmission to the second MANET node. The second controller may be configured to generate the normalized reception value based upon the respective received signal-to-noise ratio (SNR) value for each transmission normalized based upon an actual transmit data rate relative to a common transmit data rate. The second controller may be configured to generate the normalized reception value based upon the respective received signal-to-noise ratio (SNR) value for each transmission normalized based upon an actual transmit frequency relative to a common transmit frequency.

In yet another example, the first controller may be configured to control the transmit power level for the subsequent transmission to within a threshold value based upon the normalized reception value. The first and second RF transceivers may each comprise a frequency hopping RF transceiver. The normalized reception value may be based upon at least one of a common transmit power level, a common transmit data rate, and a common transmit frequency. In addition, the second controller may be configured to de-normalize the normalized reception value based upon at least one of the common transmit power, the common transmit data rate, and the common transmit frequency.

Another aspect is directed to a method of operating a mobile ad hoc network (MANET) that may comprise a first MANET node comprising a first radio frequency (RF) transceiver and a first controller coupled thereto to generate a plurality of RF transmissions, and a second MANET node comprising a second RF transceiver configured to communicate with the first RF transceiver. A second controller may be coupled to the second RF transceiver. The method may comprise operating the second controller to cooperate with the second RF transceiver to receive the plurality of RF transmissions from the first MANET node, generate a normalized reception value based upon the received plurality of RF transmissions, and send the normalized reception value to the first MANET node. The method may further include operating the first controller to control a transmit power level for a subsequent transmission based upon the normalized reception value from the second MANET node.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
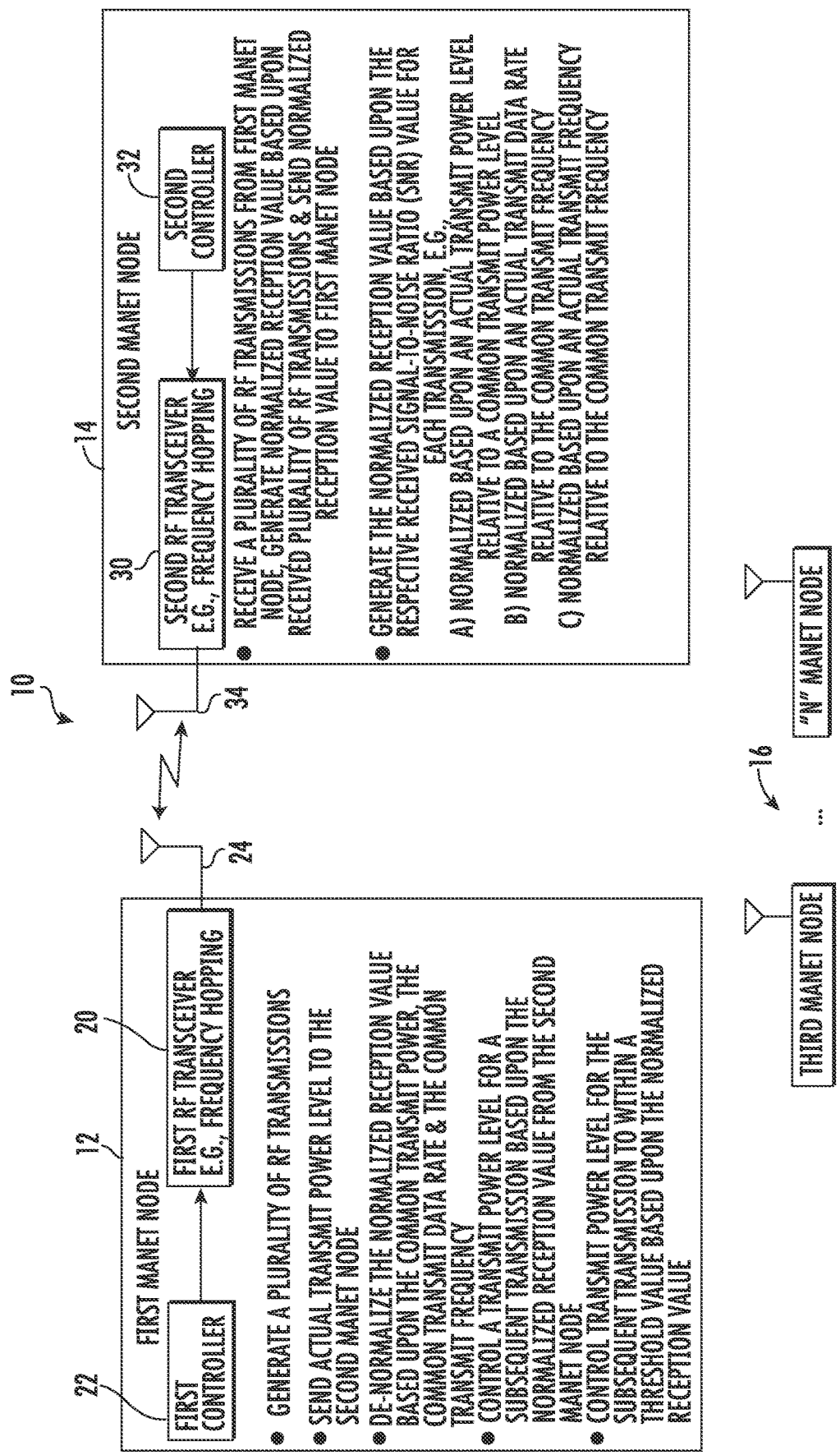
FIG. 1 is schematic block diagram of the mobile ad hoc network (MANET) in accordance with an example embodiment.

Referring initially to FIG. 1, a mobile ad hoc network (MANET) is illustrated generally at 10 and includes a first MANET node 12 and a second MANET node 14. Other mobile nodes are illustrated generally at 16 and indicated as a third MANET node and an increasing number such that "n" MANET nodes are employed, indicative that the MANET 10 may include a large plurality of different nodes. The first MANET node 12 could be formed as a stationary or mobile device, and in this example as a mobile wireless communications device, and include a first radio frequency (RF) transceiver 20 and a first controller 22 coupled thereto to generate a plurality of RF transmissions via a first antenna 24 connected to the first RF transceiver.

The second MANET node 14 includes a second RF transceiver 30 and connected second controller 32 and configured to communicate with the first RF transceiver 20 via a second antenna 34. The second controller 32 is configured to cooperate with the second RF transceiver 30 to receive the plurality of RF transmissions from the first MANET node 12, generate a normalized reception value based upon the received plurality of RF transmissions, and send the normalized reception value to the first MANET node 12.

The first controller 22 at the first MANET node 12 is configured to control a transmit power level for a subsequent transmission based upon the normalized reception value from the second MANET node 14. The second controller 32 may be configured to generate the normalized reception value based upon a respective received signal-to-noise ratio (SNR) value for each transmission. The second controller 32 may also be configured to generate the normalized reception value based upon the received signal-to-noise ratio (SNR) value for each transmission normalized based upon an actual transmit power level relative to a common transmit power level. The first controller 22 may be configured to cooperate with the first RF transceiver 20 to send the actual transmit power level to the second MANET node 14.

The second controller 32 may be configured to generate the normalized reception value based upon the respective received signal-to-noise ratio (SNR) value for each transmission normalized based upon an actual transmit data rate relative to a common transmit data rate. The second controller 32 may also be configured to generate the normalized reception value based upon the respective received signal-to-noise ratio (SNR) value for each transmission normalized based upon an actual transmit frequency relative to a common transmit frequency.

The first controller 22 may be configured to control the transmit power level for the subsequent transmission to within a threshold value based upon the normalized reception value. The first and second RF transceivers 20, 30 in an example are each formed as a frequency hopping RF transceiver and may include a frequency hopping, spread spectrum transceiver. However, other RF transceivers using different communications protocols may be used. The normalized reception value may be based upon at least one of a common transmit power level, a common transmit data rate, and a common transmit frequency. The second controller 32 may be configured to de-normalize the normalized reception value based upon at least one of the common transmit power, the common transmit data rate, and the common transmit frequency.

Figure 2:
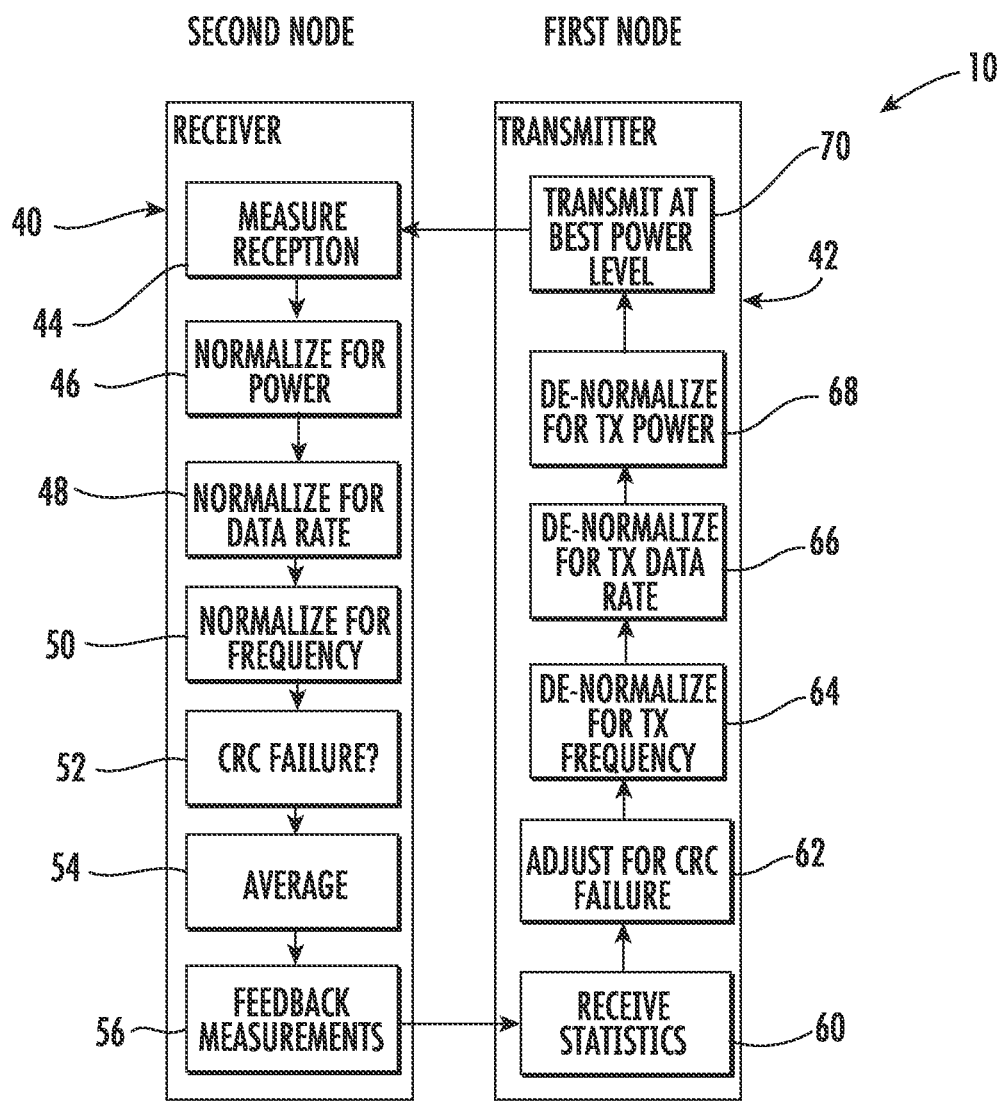
FIG. 2 is a schematic block diagram showing a flow sequence for obtaining a normalized reception value and controlling a transmit power level based upon the normalized reception value.

Referring now to FIG. 2, general details of a flow sequence for obtaining a normalized reception value and controlling a transmit power level based upon the normalized reception value are illustrated with reference to two mobile nodes labeled as First Node and Second Node with functions of a receiver 40 shown for the Second Node and functions of a transmitter 42 shown for the First Node. It should be understood that the flow sequence for both the receiver 40 and transmitter 42 may correspond to either the first MANET node 12 or the second MANET node 14 depending on their transmit or receive functions relative to any neighboring nodes and the link conditions to provide the adaptive power control as described above.

Different nodes may target transmissions at a power level such that all known receivers 40 within a reception area may receive the signal at a level just above sensitivity, which may include a tunable margin, e.g., between 5 and 10 dB. Generally, this may be achieved by measuring the receive SNR at the receiver 40 against a known or announced transmit power level and feeding that information back to a transmitter 42 at the other node in a low-overhead fashion.

For example, the receiver 40 may measure reception 44 and normalize for power 46, normalize for data rate 48, normalize for frequency 50, and determine if there is a cyclic redundancy check (CRC) failure 52. The receptions are averaged 54 and the feedback measurements as a normalized reception value 56 are transmitted back to the transmitter 42 at the First Node as receive statistics 60. Adjustments are made for any CRC failure 62, and de-normalized for the transmit frequency 64, de-normalized for the transmit data rate 66 and de-normalized for the transmit power 68. The transmitter 42 at the First Node then controls a transmit power level to make a subsequent transmission at the best power level, such that the transmission will arrive at the intended receiver at the desired signal strength 70.

Figure 3:
FIG. 3 are charts showing example reception signal values that are normalized.

When the normalized reception values as feedback measurements are fed back to transmitting nodes, such as from the Second Node to the First Node shown in FIG. 2, that data has been normalized and averaged to reduce overhead and reduce the transmission-tracking complexity at the transmitter 42. In a specific example of the MANET 10, different values are shown in the two charts 72,74 of FIG. 3. In this example, there is normalization to the data rate, or Modulation Coding Scheme (MCS), where each MCS may be separated by three (3) dB of performance. Each node in the MANET 10 may share a common normalized data rate, such as MCS4. Each reception measurement at a node may be adjusted as if it is received at MCS4. For example, if the Second Node receives a signal at the MCS5 data rate, its receiver 40 would detect that the MCS4 data rate would have 3 dB better SNR, and thus, the normalized value would be increased for this reception by 3 dB.

The MANET 10 also normalizes to transmit power level. For example, each node in the MANET 10 may share a common normalized transmit power of +30 dBm in a specific application. Reception measurements are adjusted as if they originated at +30 dBm. If a transmission is originally transmitted at +10 dBm, then 20 dB is added to the SNR to adjust it to the normalized transmit power.

The MANET 10 may normalize the frequency in a frequency hopping MANET, where each node shares a common normalization frequency, which may be the center of the frequency hopping band. For example, if the range of frequency hopping is 300 to 400 MHz, the normalization frequency may be 350 MHz. Each reception measurement may be adjusted as if it originated on 350 MHz, using for example, an Okamura-Hata derived frequency adjustment where the pathloss at each frequency is estimated using Pathloss=$25.52*Log_{10}$(frequency). Any other pathloss model may be used.

The Okamura-Hata model allows for pathloss prediction in urban areas and other crowded communication networks, giving a median attenuation, relative to free space, as a function of frequency, distance, height, and other path-specific correction factors. A result may be a median value of basic propagation loss, as a function of frequency, distance, base station height and mobile antenna height.

Figure 4:
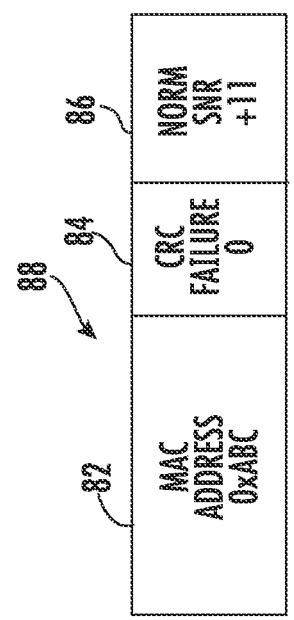
FIG. 4 is a block diagram showing an example format for a normalized reception value.
Figure 4:
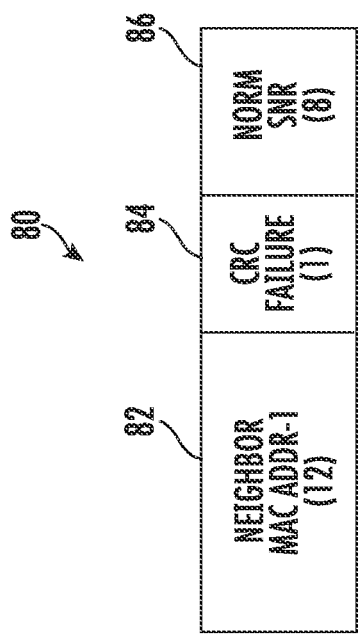

It is also possible to incorporate the cyclic redundancy check (CRC) information and use the last good SNR value as a basis for feedback to the transmitter. The normalized receptions may be averaged from a given node and sent back to the other node as a normalized reception value. A specific example of normalized values are shown in the charts 72,74 of FIG. 3 where three actual receptions 72 are shown in the rows of the chart. The first reception on the first line includes the received power of +15 dBm, an MCS of 3, a 300 MHz frequency in the frequency hopping scheme, and an SNR of 3. The first, second and third receptions shown respectively on each line, are normalized into the values shown on the first to third lines in the second chart 74. These values are then averaged, rounded and conveyed back to the transmitter as a normalized reception value in a format shown in the diagram of FIG. 4, where the left-hand section 80 shows the number of bits used for a neighboring MAC (Media Access Control) address 82 for the node to which it is transmitting back the normalized reception value. A one-bit identifier 84 is indicative of whether there is a CRC failure and 8 bits as a byte are used to identify the normalized SNR 86. The right-hand section 88 shows an actual value for the MAC address of the node as OxABC and the CRC as 0, indicating there is no CRC failure, and the normalized SNR of 11. Any MANET node that receives this information will have its controller configured to control the transmitter power level for a subsequent transmission based upon that normalized reception value from this other MANET node.

Each MANET node in the MANET 10 adapts power to each of its neighboring nodes. Each node in the MANET 10 does not require any command-node to dictate at what power level each node is to transmit. The MANET nodes do not require a specific control channel in which transmissions are sent at actual power. Every MANET node conveys received statistics as a normalized reception value back to each of its neighboring MANET nodes such that a neighboring MANET node transceiver may select the correct power level to reach its neighbors back without excess overhead.

Figure 5:
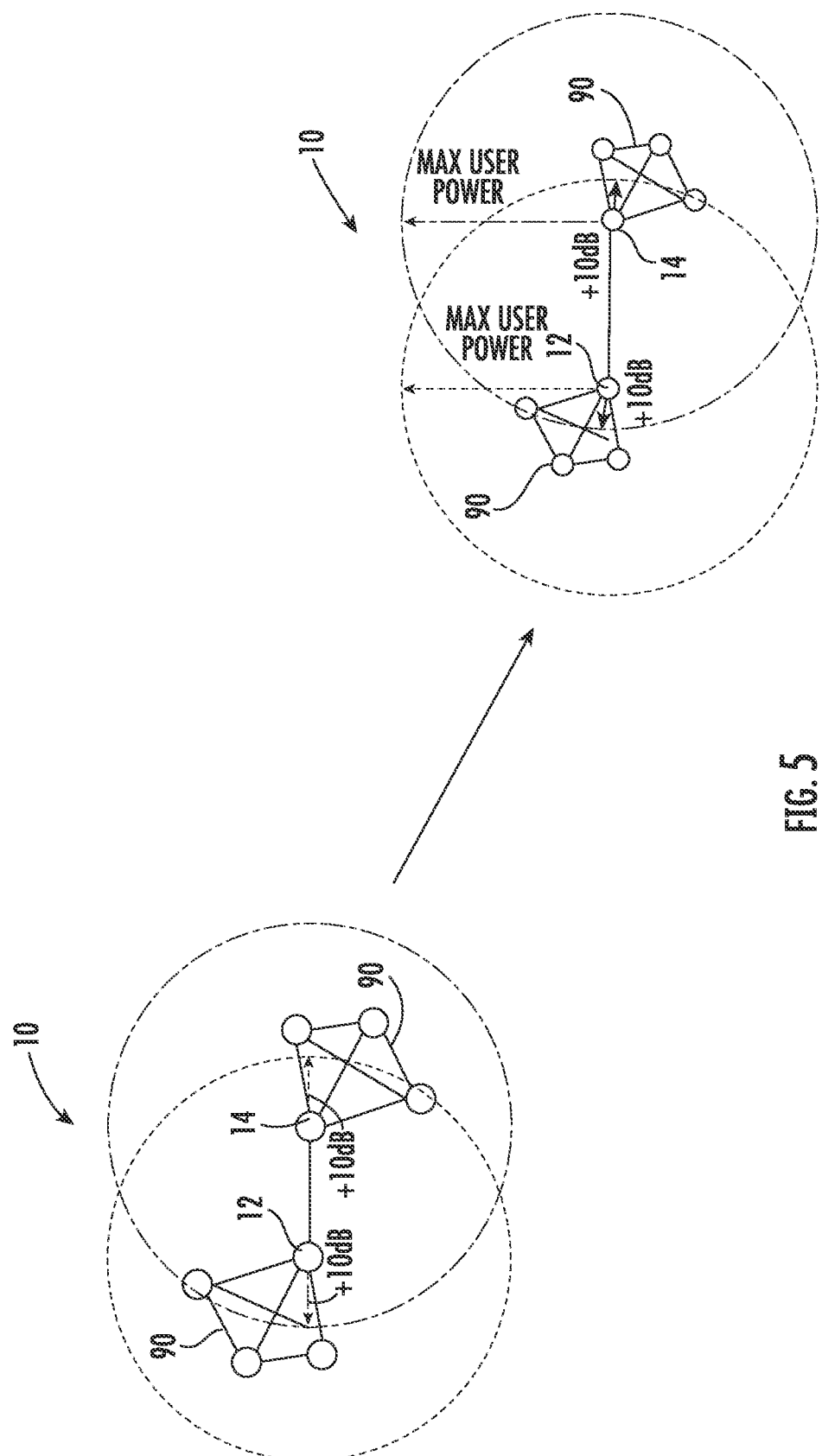
FIG. 5 is a schematic diagram of a MANET showing an example of how nodes adapt power individually.

An example MANET 10 is shown in FIG. 5 where the left-hand section shows the MANET having 8 nodes indicated generally at 90 and a first MANET node 12 communicating with a second MANET node 14 at +10 dB above the minimum receivable signal strength. As two groups of nodes 90 drift apart as shown on the right-hand side where the first MANET node 12 is further spaced from the second MANET node 14, the nodes may increase their power to each other individually. First MANET node 12 and second MANET node 14 will raise their transmit power levels, as the nodes move apart, to maintain the +10 dB margin above the minimum receivable signal strength.

Figure 6:
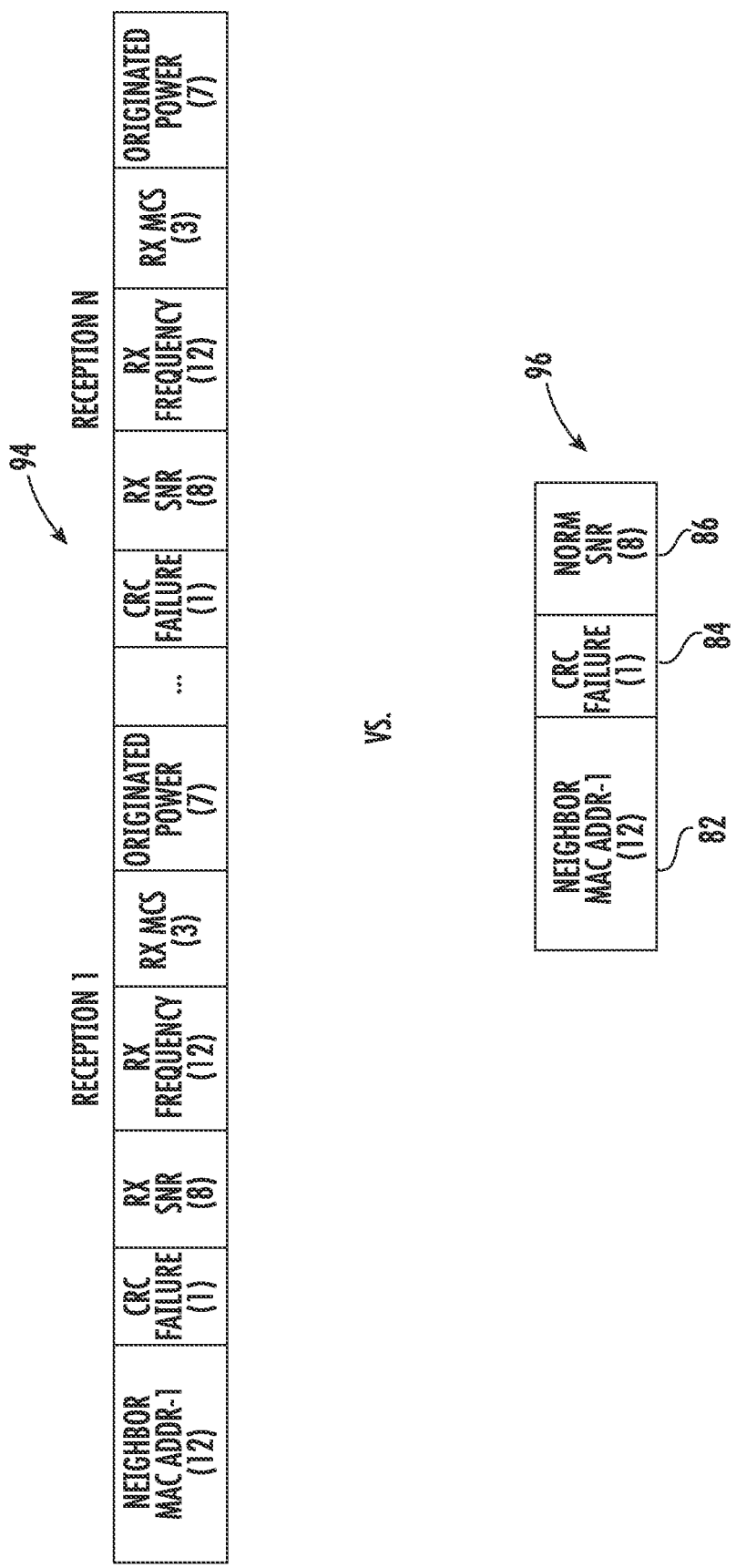
FIG. 6 is a block diagram showing an example of a plurality of individual data reception measurements versus a normalized reception value.

The benefits of the MANET 10 as described are shown in the reception examples of FIG. 6, where the top row 94 shows an example of a number of individual data reception measurements that are transmitted back serially to a controller node in a conventional MANET, versus the normalized reception value 96 that is based upon the received and averaged plurality of RF transmissions. The normalized reception value 96 is transmitted to a neighboring MANET node. The top row 94 in FIG. 6 shows serial receptions (1 to N). Each serial reception (1 to N) includes the Neighbor MAC address as 12 bits, followed by the CRC failure (1 bit), the received SNR (a byte), received frequency (12 bits), received MCS (3 bits), and originated power (7 bits). This large amount of data in serialized receptions is compared to the normalized reception value 96 shown in the lower row of FIG. 6, indicating the limited data that makes up the normalized reception value. The MANET 10 has limited overhead. Controllers are configured to control the transmit power level in respective RF transceivers for subsequent transmissions based upon the normalized reception value 96 from a neighboring MANET node and adjust power accordingly. The MANET 10 operates based upon an algorithm that is fully distributed and ad hoc without requiring any special infrastructure or special high-power control channels.

Figure 7:
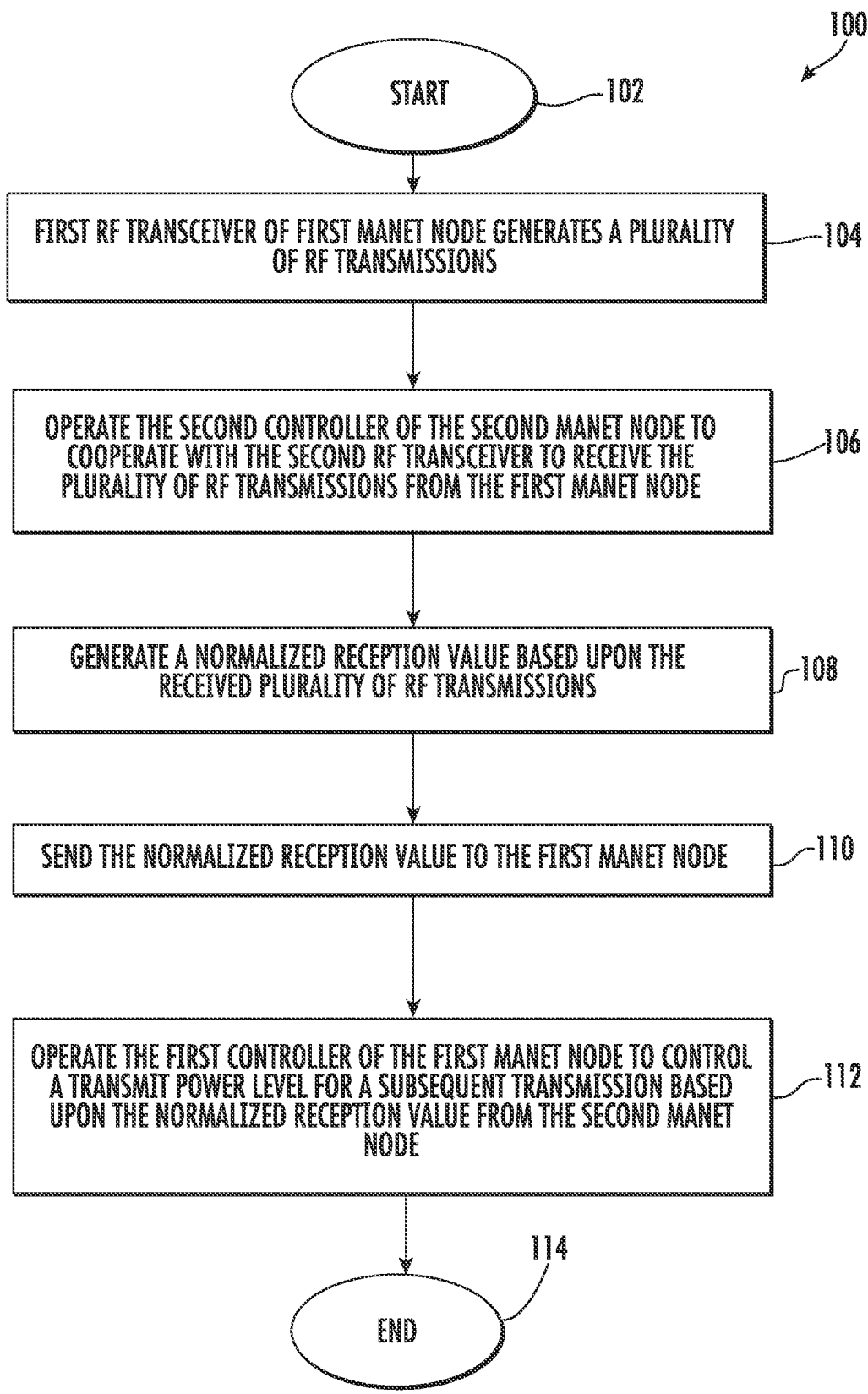
FIG. 7 is a flowchart showing an example of operation for the MANET of FIG. 1.

Referring now to FIG. 7, a high-level flowchart of a method used for operating a mobile ad hoc network (MANET) 10 of FIG. 1 is illustrated and shown generally at 100 and described with reference to the first MANET node 12 and second MANET node 14. The process starts (Block 102) and the first RF transceiver 20 of the first MANET node 12 generates a plurality of RF transmissions (Block 104). The second controller 32 of the second MANET node 14 is operated to cooperate with the second RF transceiver 30 and receive the plurality of RF transmissions from the first MANET node 12 (Block 106). A normalized reception value is generated based upon the received plurality of RF transmissions (Block 108). The normalized reception value is sent to the first MANET node 12 (Block 110). The first controller 22 of the first MANET node 12 is operated to control a transmit power level for a subsequent transmission based upon the normalized reception value from the second MANET node 14 (Block 112). The process ends (Block 114).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A mobile ad hoc network (MANET) comprising:
   a first MANET node comprising a first radio frequency (RF) transceiver and a first controller coupled thereto to generate a plurality of RF transmissions, the plurality of RF transmissions comprising respective actual transmission power levels; and
   a second MANET node comprising a second RF transceiver configured to communicate with the first RF transceiver, and a second controller coupled to the second RF transceiver;
   the second controller configured to cooperate with the second RF transceiver to receive the plurality of RF transmissions from the first MANET node, generate a normalized reception value based upon the received plurality of RF transmissions and send the normalized reception value to the first MANET node, the normalized reception value being based upon a respective received signal-to-noise ratio (SNR) value and the actual transmit power level relative to a common transmit power level;
   the first controller configured to control a transmit power level for a subsequent RF transmission based upon de-normalizing the normalized reception value from the second MANET node.

2. The MANET according to claim 1 wherein the second controller is configured to generate the normalized reception value based upon the respective received signal-to-noise ratio (SNR) value for each RF transmission normalized based upon an actual transmit data rate relative to a common transmit data rate.

3. The MANET according to claim 1 wherein the second controller is configured to generate the normalized reception value based upon the respective received signal-to-noise ratio (SNR) value for each RF transmission normalized based upon an actual transmit frequency relative to a common transmit frequency.

4. The MANET according to claim 1 wherein the first controller is configured to control the transmit power level for the subsequent RF transmission to within a threshold value based upon the normalized reception value.

5. The MANET according to claim 1 wherein the first and second RF transceivers each comprises a frequency hopping RF transceiver.

6. The MANET according to claim 1 wherein the normalized reception value is based upon at least one of a common transmit data rate, and a common transmit frequency; and wherein the first controller is configured to de-normalize the normalized reception value based upon at least one of the common transmit data rate, and the common transmit frequency.

7. A mobile ad hoc network (MANET) comprising:
   a first MANET node comprising a first radio frequency (RF) transceiver and a first controller coupled thereto to generate a plurality of RF transmissions, the plurality of RF transmissions comprising respective actual transmission power levels; and
   a second MANET node comprising a second RF transceiver configured to communicate with the first RF transceiver, and a second controller coupled to the second RF transceiver;
   the second controller configured to cooperate with the second RF transceiver to receive the plurality of RF transmissions from the first MANET node, generate a normalized reception value based upon the received plurality of RF transmissions and send the normalized reception value to the first MANET node, the normalized reception value being based upon a respective received signal-to-noise ratio, the actual transmit power level, a common transmit power level, a common transmit data rate, and a common transmit frequency;
   the first controller configured to control a transmit power level for a subsequent RF transmission based upon de-normalizing the normalized reception value from the second MANET node.

8. The MANET according to claim 7 wherein the second controller is configured to generate the normalized reception value based upon the respective received signal-to-noise ratio (SNR) value for each RF transmission normalized based upon an actual transmit data rate relative to the common transmit data rate.

9. The MANET according to claim 7 wherein the second controller is configured to generate the normalized reception value based upon the respective received signal-to-noise ratio (SNR) value for each RF transmission normalized based upon an actual transmit frequency relative to the common transmit frequency.

10. The MANET according to claim 7 wherein the first controller is configured to control the transmit power level for the subsequent RF transmission to within a threshold value based upon the normalized reception value.

11. The MANET according to claim 7 wherein the first and second RF transceivers each comprises a frequency hopping RF transceiver.

12. The MANET according to claim 7 wherein the first controller is configured to de-normalize the normalized reception value based upon the common transmit power, the common transmit data rate, and the common transmit frequency.

13. A method of operating a mobile ad hoc network (MANET) comprising a first MANET node comprising a first radio frequency (RF) transceiver and a first controller coupled thereto to generate a plurality of RF transmissions comprising respective actual transmission power levels, and a second MANET node comprising a second RF transceiver configured to communicate with the first RF transceiver, and a second controller coupled to the second RF transceiver; the method comprising:
   operating the second controller to cooperate with the second RF transceiver to receive the plurality of RF transmissions from the first MANET node, generate a normalized reception value based upon the received plurality of RF transmissions and send the normalized reception value to the first MANET node, the normalized reception value being based upon a respective received signal-to-noise ratio (SNR) value and the actual transmit power level relative to a common transmit power level; and operating the first controller to control a transmit power level for a subsequent RF transmission based upon de-normalizing the normalized reception value from the second MANET node.

14. The method according to claim 13 comprising operating the second controller to generate the normalized reception value based upon the respective received signal-to-noise ratio (SNR) value for each RF transmission normalized based upon an actual transmit data rate relative to a common transmit data rate.

15. The method according to claim 13 comprising operating the second controller to generate the normalized reception value based upon the respective received signal-to-noise ratio (SNR) value for each RF transmission normalized based upon an actual transmit frequency relative to a common transmit frequency.

16. The method according to claim 13 comprising operating the first controller to control the transmit power level for the subsequent RF transmission to within a threshold value based upon the normalized reception value.

17. The method according to claim 13 wherein the first and second RF transceivers each comprises a frequency hopping RF transceiver.

18. The method according to claim 13 wherein the normalized reception value is based upon at least one of a common transmit data rate, and a common transmit frequency; and comprising operating the first controller to de-normalize the normalized reception value based upon at least one of the common transmit data rate, and the common transmit frequency.

* * * * *